US012656663B2

(12) United States Patent
Thorn et al.

(10) Patent No.: US 12,656,663 B2
(45) Date of Patent: Jun. 16, 2026

(54) MODULAR OPTICAL SYSTEM FOR OPHTHALMIC IMAGING AND RELATED METHODS THEREOF

(71) Applicant: Phoenix-Micron, Inc., Bend, OR (US)

(72) Inventors: Jonathan Roy Thorn, Bend, OR (US); Jonathan Scott Carr, Bend, OR (US)

(73) Assignee: Phoenix-Micron, Inc., Bend, OR (US)

( * ) Notice: Subject to any disclaimer, the term of this patent is extended or adjusted under 35 U.S.C. 154(b) by 84 days.

(21) Appl. No.: 18/904,477

(22) Filed: Oct. 2, 2024

(65) Prior Publication Data

US 2025/0116917 A1     Apr. 10, 2025

Related U.S. Application Data

(60) Provisional application No. 63/543,252, filed on Oct. 9, 2023.

(51) Int. Cl.
  *G03B 17/14*     (2021.01)
  *G03B 15/14*     (2021.01)
(52) U.S. Cl.
  CPC ............. *G03B 17/14* (2013.01); *G03B 15/14* (2013.01)

(58) Field of Classification Search
  CPC ................................ G03B 17/14; G03B 15/14
  See application file for complete search history.

(56) References Cited

U.S. PATENT DOCUMENTS

| | | | |
|---|---|---|---|
| 6,313,960 B2 * | 11/2001 | Marquiss | ................ B01L 9/523 359/889 |
| 2015/0316479 A1 * | 11/2015 | Thrush | ............... G01N 21/6456 250/216 |
| 2016/0025949 A1 * | 1/2016 | Platt | ....................... G02B 7/005 359/889 |

* cited by examiner

*Primary Examiner* — Gevell V Selby
(74) *Attorney, Agent, or Firm* — Kilpatrick Townsend & Stockton LLP

(57) ABSTRACT

The present disclosure is related to an imaging camera including a filter wheel. The filter wheel includes a main body including a plurality of receptacles and a plurality of wedges. Each of the wedges is attached to one of the plurality of receptacles. Each of the wedges includes a receiving orifice to a filter. The main body of the filter wheel includes an adapter configured to receive an actuator to actuate the filter wheel. Each wedge is removably attached to one of the plurality of receptacles. The filter wheel is configured to rotate around a central axis of the main body.

16 Claims, 9 Drawing Sheets

600

MODULAR OPTICAL SYSTEM FOR OPHTHALMIC IMAGING AND RELATED METHODS THEREOF

CROSS-REFERENCES TO RELATED APPLICATIONS

This application claims priority to and the benefit of U.S. Provisional Patent Application No. 63/543,252, filed Oct. 9, 2023, which is hereby incorporated by reference in its entirety for all intents and purposes.

BACKGROUND OF THE INVENTION

Eye imaging cameras for ophthalmic imaging are used for evaluating potential eye diseases, vision impairments, and indicators of various other diseases. Eye imaging cameras may include multiple lenses and other optical elements that provide different imaging modalities. For example, a specific set of optical filters and lenses may be used for taking images of the eye for different evaluation criteria (e.g., dilation, color. Etc.). However, eye imaging cameras do not provide components that are modular such that removal of one component essentially disables the system mechanically and optically. Additionally, replacing lenses or optical filters in an eye imaging camera may require a technician due to the complexity of the system.

Although eye imaging cameras have been developed, there is a need in the art for improved systems and methods for modular eye imaging cameras that provide different imaging modalities.

SUMMARY OF THE INVENTION

The present disclosure relates to a modular system for ophthalmic imaging that provides multiple interchangeable lenses and filters for eye imaging cameras. Beneficially, the modular system for ophthalmic imaging can reduce time between imaging, provide multiple interchangeable lenses for different images of the eye, and provide an array of filters for imaging. The modular system provides a customizable system for lenses and filters for ophthalmoscopy. The system can reduce deconstruction, reconstruction, and manipulation of the components of the eye imaging system to reposition the lenses for a particular optical filter.

Embodiments of the present disclosure include an imaging camera comprising: a filter wheel comprising: a main body including a plurality of receptacles; a plurality of wedges, wherein each of the wedges is attached to one of the plurality of receptacles, wherein each of the wedges includes a receiving orifice; a filter disposed in the receiving orifice of each of the wedges; and an adapter configured to receive an actuator to actuate the filter wheel, wherein each wedge is removably attached to one of the plurality of receptacles, wherein the filter wheel is configured to rotate around a central axis of the main body. In some embodiments, the plurality of wedges includes a first wedge and a second wedge, wherein the filter disposed in the first wedge is different from the filter disposed in the second wedge. In some embodiments, the filter wheel is substantially circular, wherein each wedge comprises a top surface that forms a portion of an outer circumference of the filter wheel. In some embodiments, each of the wedges comprises a concave edge disposed at a bottom surface, wherein the receptacle comprises a convex surface, wherein the concave edge of a wedge abuts and contacts the convex surface of the receptacle. In some embodiments, the main body comprises a plurality of spokes extending from the main body, wherein each receptacle is disposed between an adjacent pair of spokes. In some embodiments, the filter wheel further comprises a convertor configured to attach to the receiving orifice of the wedge, wherein the convertor provides a different size dimension than the receiving orifice. In some embodiments, the adapter comprises a plurality of grooves to receive one or more prongs from an actuator. In some embodiments, the imaging device comprises a lens aligned with at least one filter. In some embodiments, the imaging camera further comprises a magnetic attachment system comprising a receiving member and a backplate, wherein the backplate is coupled to a lens. In some embodiments, the receiving member comprises a base including a first retaining wall and a second retaining wall, wherein the backplate is configured to magnetically attach to the base and is retained within the receiving member via the first retaining wall and the second retaining wall. In some embodiments, the backplate is removably attached to the receiving member.

Embodiments of the present disclosure include a method for selecting a filter for imaging. The method includes providing an imaging camera including a filter wheel comprising: a main body including a plurality of receptacles; a plurality of wedges, wherein each of the wedges is attached to one of the plurality of receptacles, wherein each of the wedges includes a receiving orifice; a filter disposed in the receiving orifice of each of the wedges; and an adapter configured to receive an actuator to actuate the filter wheel, wherein each wedge is removably attached to one of the plurality of receptacles, wherein the filter wheel is configured to rotate around a central axis of the main body; selecting a filter from the plurality of wedges; rotating the filter wheel to provide a wedge including the selected filter in an imaging pathway; and aligning the selected filter with a lens of the imaging device. In some embodiments, the adapter is coupled to an actuator, wherein the filter wheel is automatically rotated to provide the wedge including the selected filter in an imaging pathway. In some embodiments, further comprising removing a wedge from the filter wheel. In some embodiments, further comprising inserting a new edge including a different filter than the removed wedge. In some embodiments, further comprising capturing an image using the imaging device after aligning the selected filter with a lens of the imaging device.

Numerous benefits are achieved by way of the present disclosure over conventional eye imaging systems. For example, embodiments of the present disclosure provide a modular system for an imaging device that provides interchangeable lenses and optical filters. The system allows for adjusting a position of an optical lens and filters on an eye imaging camera. As a result, the lenses and filters can be easily changed or adjusted without additional manipulation by an operator. These and other embodiments of the disclosure, along with many of their advantages and features, are described in more detail in conjunction with the text below and attached figures.

DETAILED DESCRIPTION OF SPECIFIC EMBODIMENTS

The present disclosure describes a number of embodiments related to a system and method for providing multiple interchangeable lenses and optical filters for an eye imaging system. In some embodiments, the present disclosure provides an eye imaging system including a filter wheel. The filter wheel includes a plurality of receptacles that are configured to receive a wedge in each respective receptacle. Each of the wedges are removably attached to a respective receptable. The wedges include an optical filter. The optical filter in each wedge is different from other filters in the filter wheel to provide multiple different optical filters for the eye imaging system. The filter wheel may include an adapter. The adapter is configured to be attached an actuator of the eye imaging system. For example, the actuator may be a rotatable arm that can be automatically or manually actuated to move the filter wheel. The filter wheel is configured to rotate about an axis (e.g., central axis) to provide a selected optical filter in the imaging pathway.

For a given imaging technique, a specific set of optical filters and lenses may be used that provide different imaging modalities. However, conventional eye imaging cameras fail to provide components that are modular in optical and mechanical terms. Therefore, replacement of a lens or optical filter component essentially disables the system mechanically and optically. Additionally, replacing lenses or optical filters in an eye imaging camera may require a technician due to the complexity of the system.

As described above, the modular eye imaging system described herein can alleviate the time and expense with changing a lens and/or optical filter of an eye imaging camera. For example, a plurality of optical filters that transmit or diffract light at different wavelengths can be provided in the filter wheel. The optical filter for a specific imaging modality can be selected by rotating the filter wheel to a provide a selected filter in the imaging path. Additionally, the modular eye imaging system described herein can include a removable lens system. The removable lens system includes a magnetic attachment system including a corresponding magnetic lens receiver. The magnetic attachment system includes a base member and a pair of retaining sidewalls for receiving and retaining the magnetic lens receiver. The magnetic lens receiver includes a backplate that is configured to slide into the base member of the magnetic attachment system. The backplate is coupled to an optical lens. The optical lens can be removably attached to the magnetic attachment system via the backplate of the magnetic lens receiver. This provides an interchangeable lens system for the eye imaging system.

Figure 1:
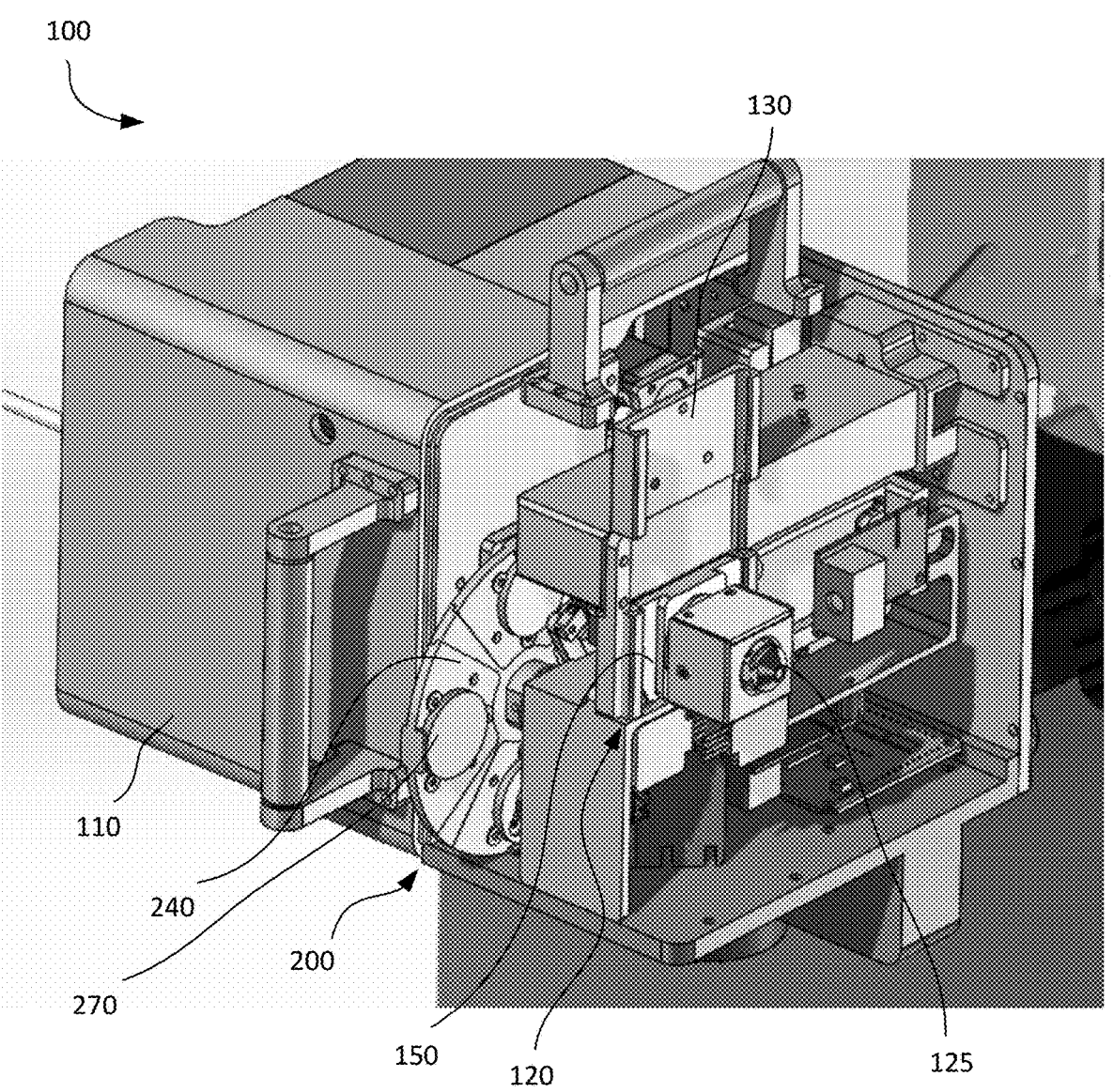
FIG. 1 illustrates an internal system of an eye imaging camera including a filter wheel and an objective lens according to some embodiments.

FIG. 1 shows an internal perspective view of an exemplary eye imaging camera 100. The eye imaging camera 100 captures high-resolution ophthalmic images and process data related to the captured ophthalmic images. The eye imaging camera 100 includes an outer housing 110. The outer housing 110 includes the internal components of the eye imaging camera system. The outer housing 110 includes a magnetic attachment system 120. The magnetic attachment system 120 is configured to receive an objective lens 125. The objective lens 125 is attached to a backplate 150 that is configured to attached to the magnetic attachment system 120. The interior of outer housing 110 includes a filter wheel 200. The filter wheel 200 includes a plurality of wedges 240. The wedges 240 include an optical filter 270. At least one optical filter 270 of the filter wheel 200 is aligned with an imaging orifice and the objective lens 125. In some embodiments, the filter wheel 200 can be manipulated (e.g., rotated) to align the optical filter 270 with the imaging orifice and the objective lens 125.

Figure 2A:
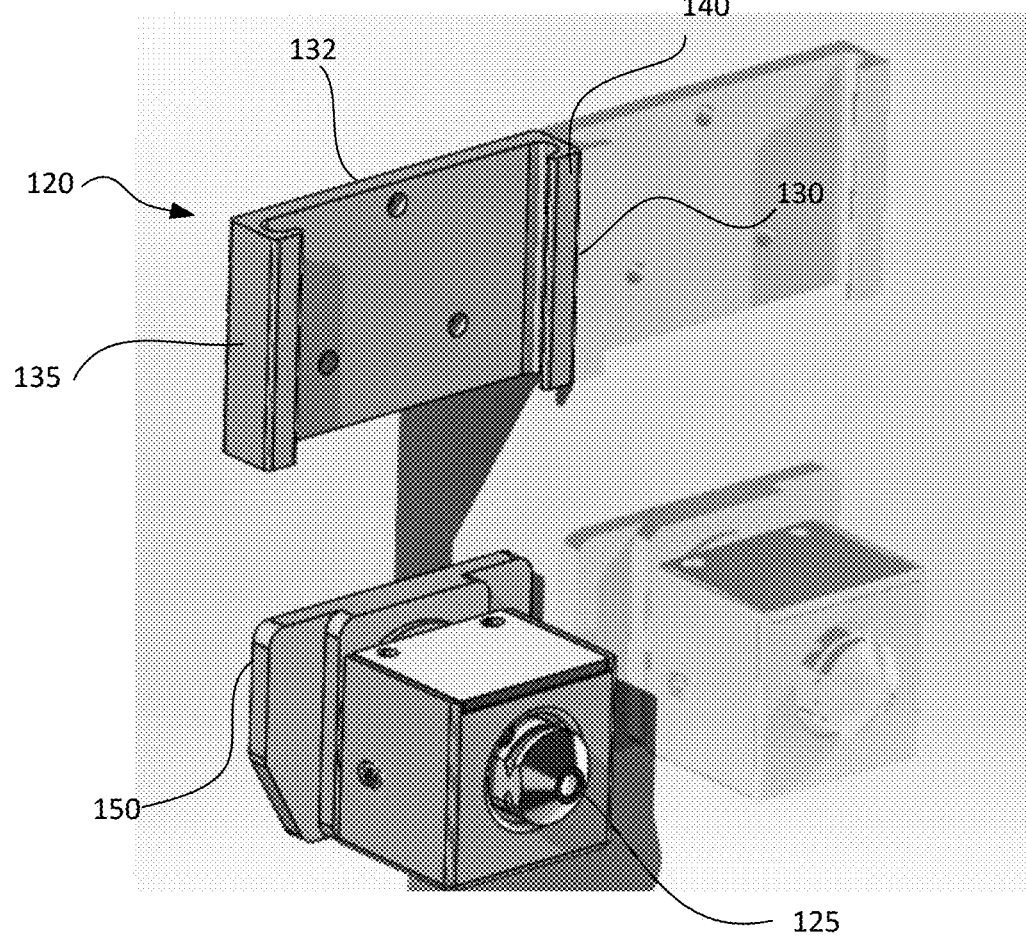
FIG. 2A illustrates a front perspective view of a magnetic attachment system including the objective lens according to some embodiments.

As shown in FIG. 2A, the magnetic attachment system 120 is configured to receive the objective lens 125. The objective lens 125 can be removably attached to the magnetic attachment system 120. In some embodiments, the objective lens 125 can be replaced with another lens with a different imaging modality. The magnetic attachment system 120 includes a receiving member 130. The receiving member 130 includes a base 132, a first retaining wall 135, and a second retaining wall 140. The first retaining wall 135 and the second retaining wall 140 are disposed on opposing sides of the base 132. The first retaining wall 135 and the second retaining wall 140 form the interior volume of the receiving member 130.

Figure 2B:
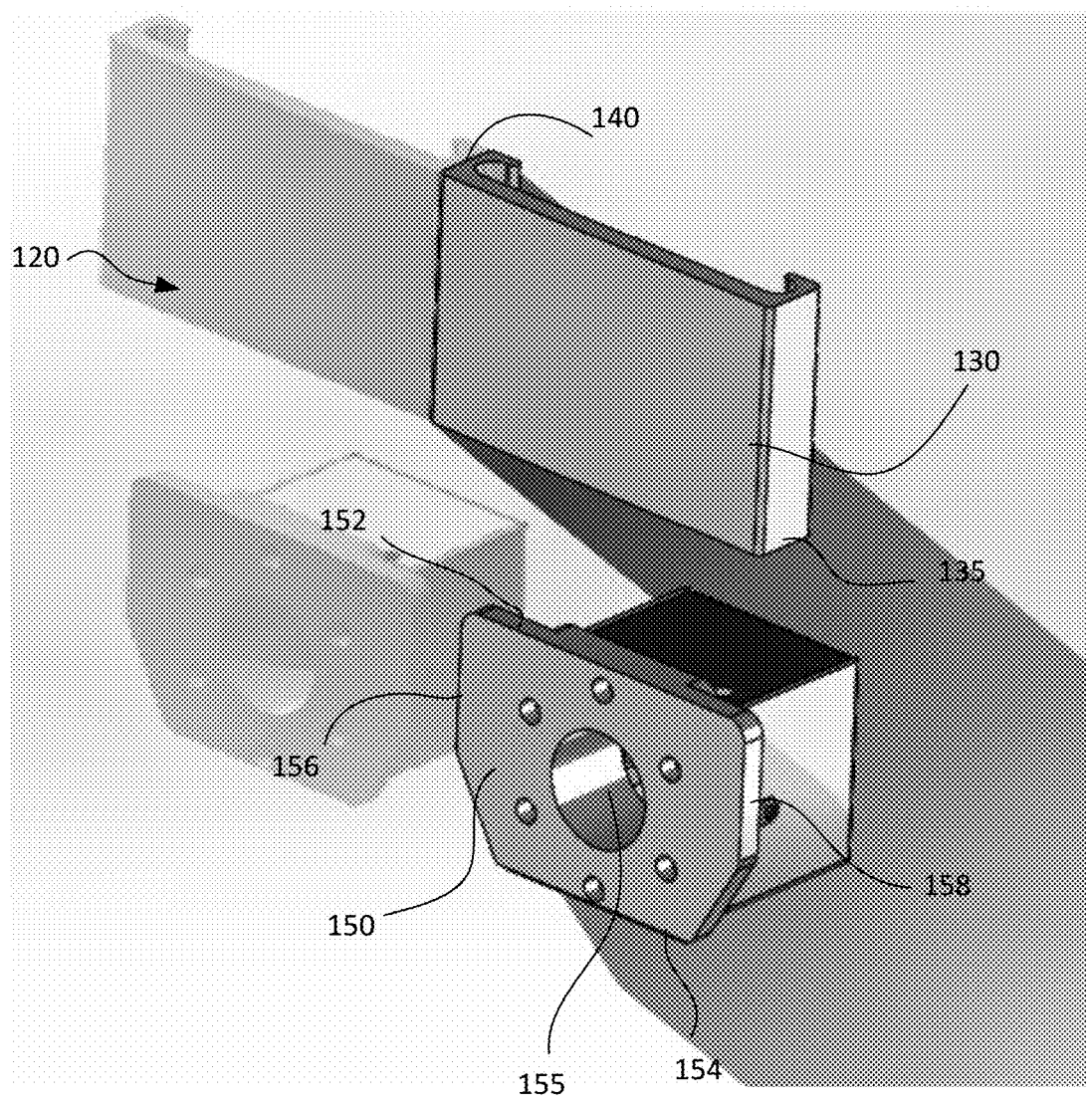
FIG. 2B illustrates a rear perspective view of a magnetic attachment system including the objective lens according to some embodiments.
Figure 3:
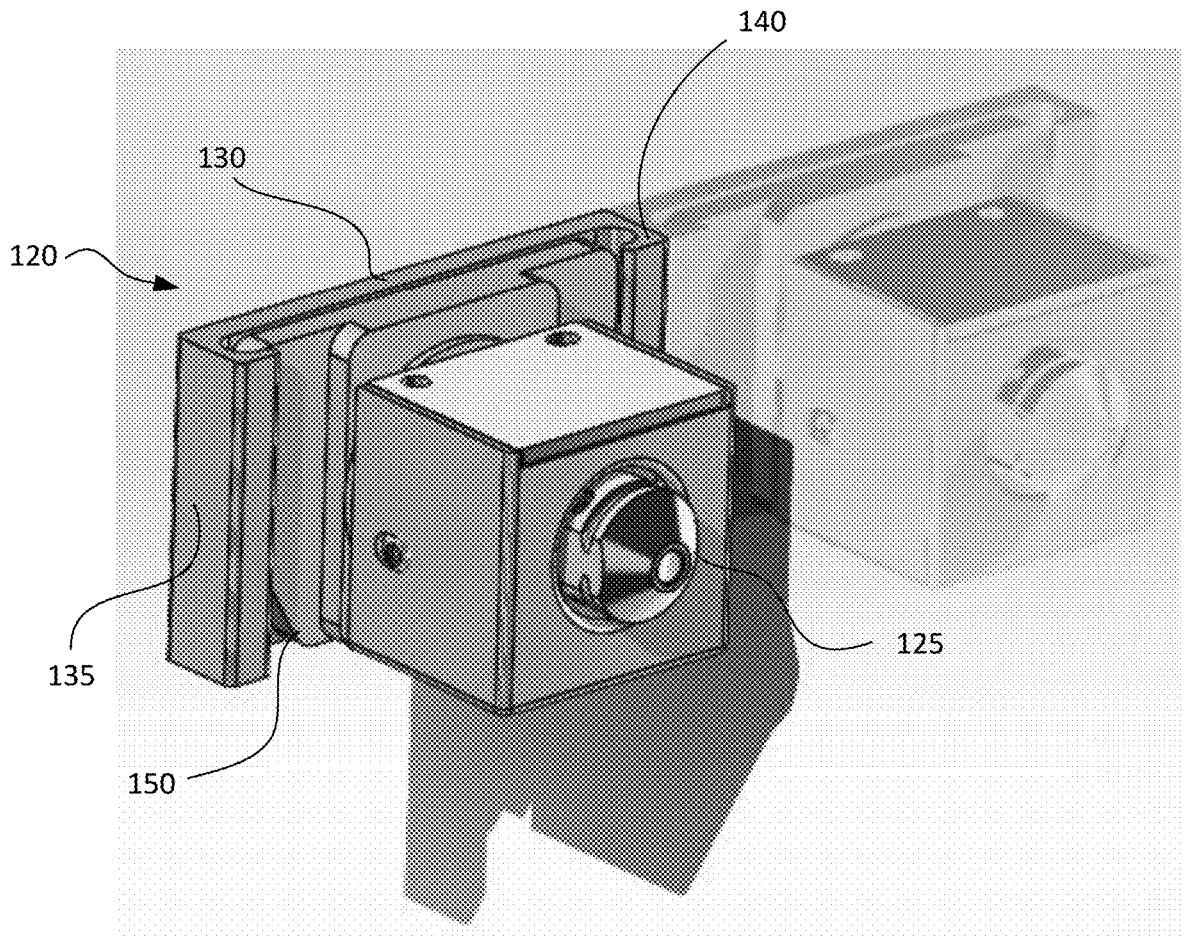
FIG. 3 illustrates a perspective view of an objective lens attached to the magnetic attachment system according to some embodiments.

The receiving member 130 is configured to receive a backplate 150. The backplate 150 is coupled to the objective lens 125. In some embodiments, the objective lens 125 may be removably attached to the backplate 150. For example, the objective lens 125 may be press fit to the backplate 150. As shown in FIG. 2B, the backplate 150 includes an imaging orifice 155. The imaging orifice 155 may be aligned with the objective lens 125 such that the backplate 150 does not obscure an imaging pathway. The backplate 150 may have dimensions that correspond to the receiving member 130 of the magnetic attachment system 120. For example, the backplate 150 may include a top wall 152, a bottom wall 154, a first sidewall 156, and a second sidewall 158. The first sidewall 156 and the second sidewall 158 taper from a first width to a second width at a region adjacent the bottom wall 154. In this way, the backplate 150 including the objective lens 125 may slide onto the receiving member 130. For example, FIG. 3 shows the objective lens 125 attached to the receiving member 130 via the backplate 150. The backplate 150 can be retained within the first retaining wall 135 and the second retaining wall 140 of the receiving member 130. The receiving member 130 and the backplate 150 may be magnetic to attach the backplate 150 to the receiving member 130 at a fixed location. For example, a region of the receiving member 130 and a region of the backplate 150 may be magnetic.

Figure 4:
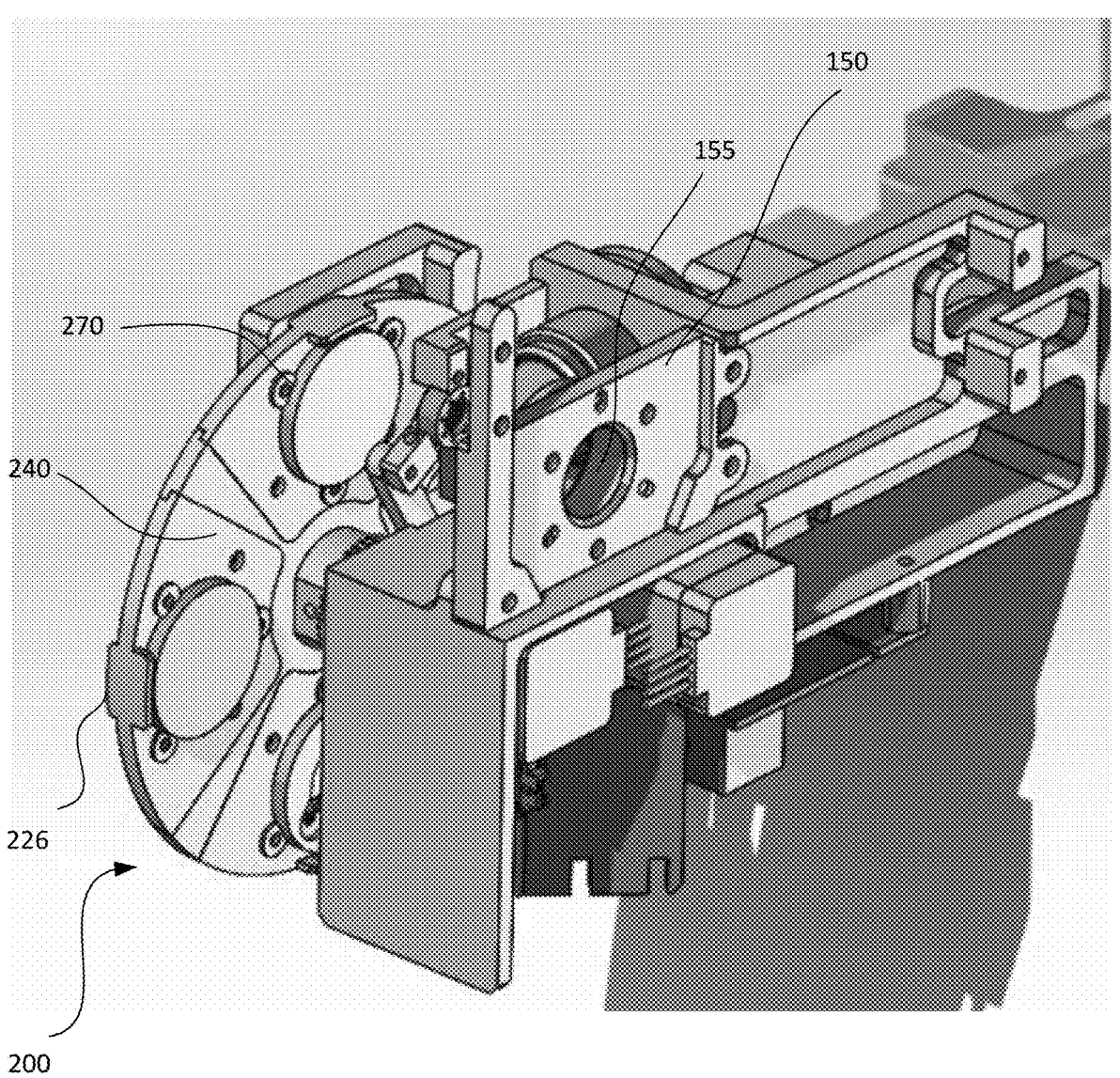
FIG. 4 illustrates a close-up internal view of an eye imaging camera including a filter wheel aligned with an imaging orifice according to some embodiments.

FIG. 4 illustrates another internal perspective view of an eye imaging camera of a close-up view of the filter wheel 200 aligned with an imaging orifice 155 of the backplate 150. In some embodiments, the filter wheel 200 is substantially circular. The filter wheel 200 includes a plurality of wedges 240. The wedges 240 form a portion of the outer circumference of the filter wheel 200. Each of the wedges 240 include an optical filter 270. The optical filter 270 in each of the wedges 240 can be different from an adjacent optical filter. The wedges 240 include a gripping area 226 on the outer circumference of the wedge 240. The gripping area 226 is region on the outer circumference of the wedge 240 that can be gripped by a user to move or manipulate the filter wheel 200. For example, the filter wheel 200 can be rotated using the gripping area 226 to provide a selected optical filter 270 in the imaging path. As shown in FIG. 4, the optical filter 270 is aligned with an imaging orifice 155. The selected optical filter 270 can diffract light coming through the imaging orifice 155.

Figure 5A:
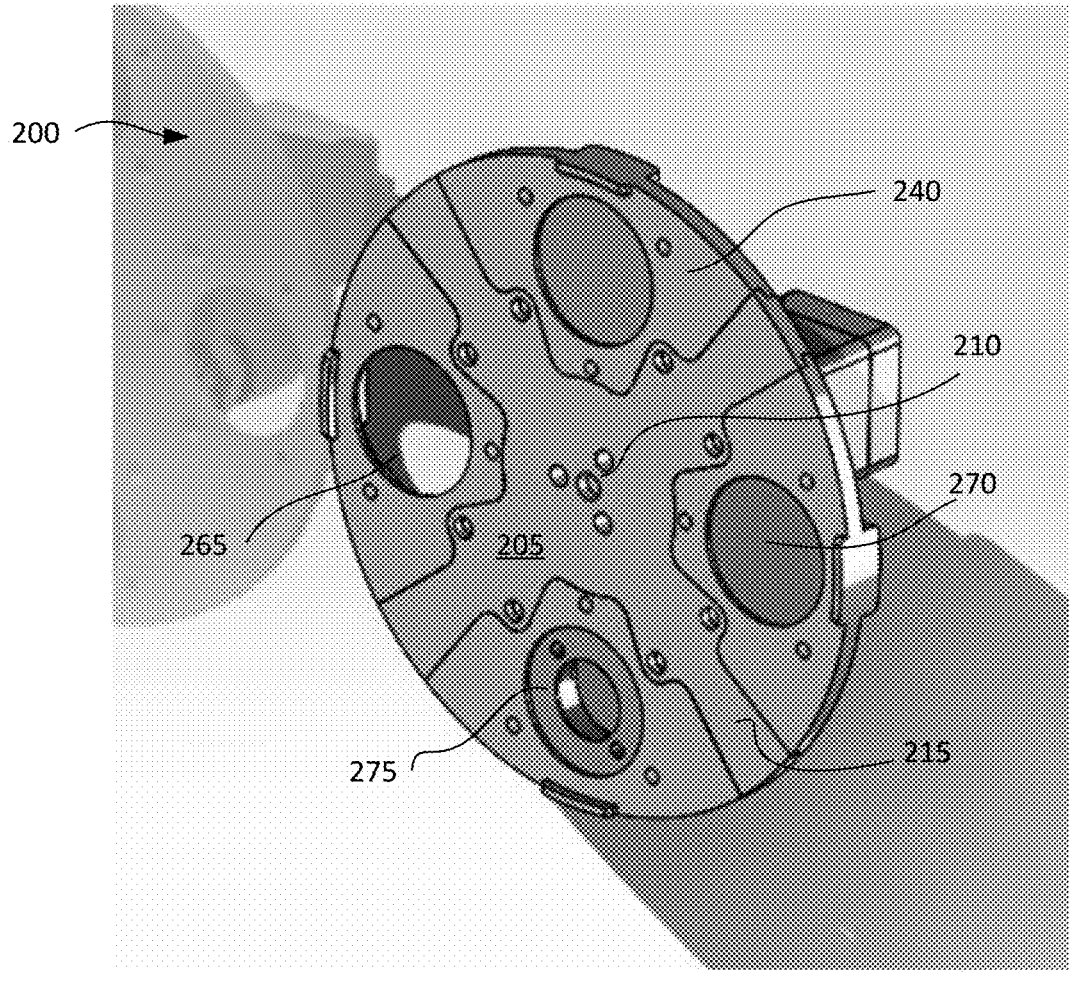
FIGS. 5A and 5B illustrate rear perspective views of a filter wheel according to some embodiments.
Figure 5B:
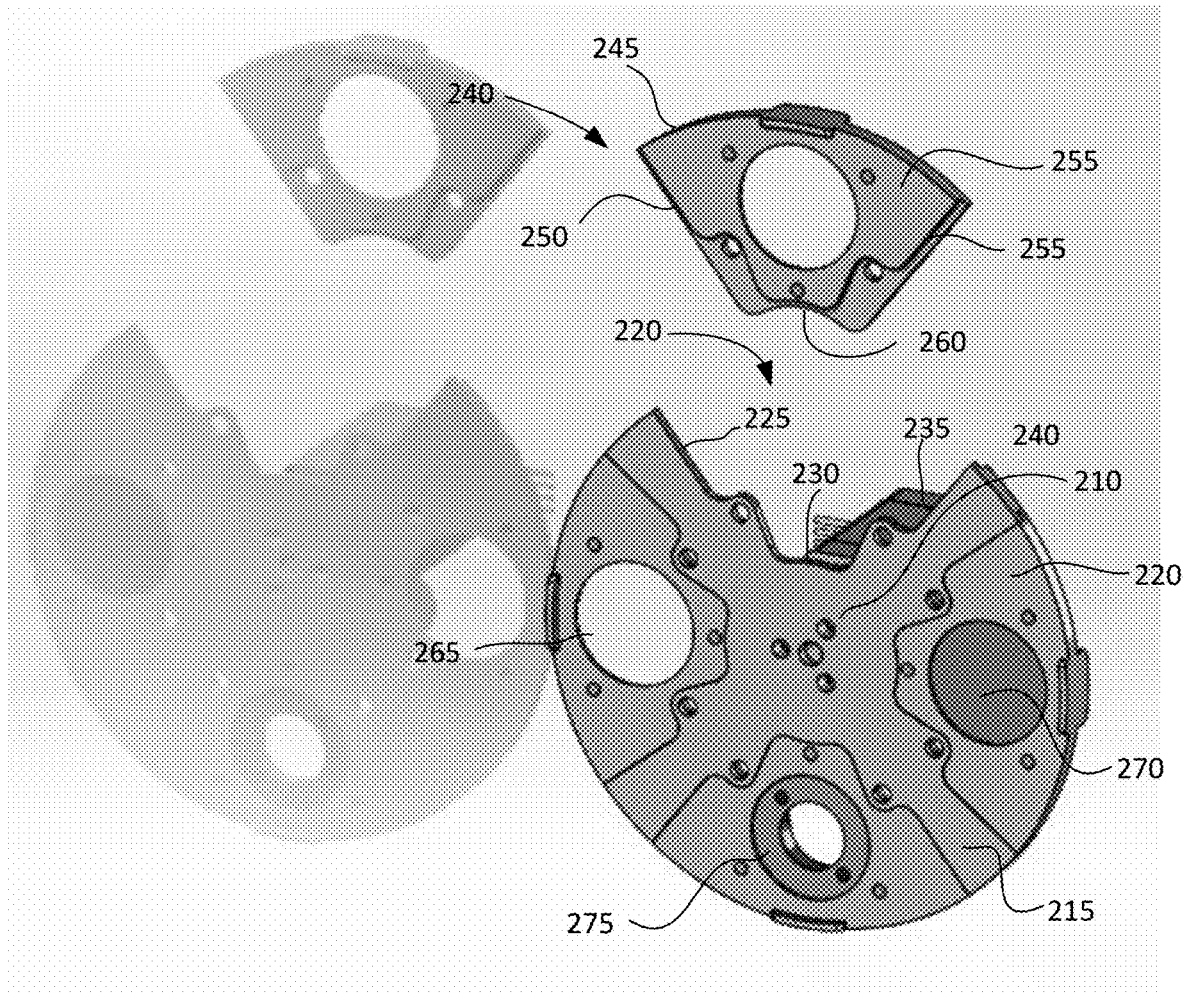

FIG. 5A shows a rear perspective view of the filter wheel 200 and FIG. 5B shows a rear perspective view of the filter wheel 200 with a wedge detached from the filter wheel 200. The filter wheel includes a main body 205. In some embodiments, the main body 205 is cross-shaped. For example, the main body 205 can have a central region 210 and a plurality of spokes 215 extending from the central region 210. The main body 205 includes a plurality of receptacles 220. The receptacles 220 are configured to receive a wedge 240. Each receptacle 220 is disposed between an adjacent pair of spokes 215. In the embodiment shown in FIG. 5B, the filter wheel 200 includes a plurality of receptacles 220 that each receive a respective wedge 240. The receptacles 220 are an open space including a contact surface that is configured to receive and retain a wedge 240. In some embodiments, the contact surface of the receptacles 220 includes a first region 225, a second region 230, and a third region 235. The first region 225 and the third region 235 may be mirror images of one another. The first region 225 and the third region 235 may be L-shaped. The second region 230 is located between the first region 225 and the third region 235. The second region 230 is located between below the first region 225 and the third region 235 and adjacent the central region of the main body 205. The second region 230 includes a convex surface.

Each of the wedges 240 are configured to be received by the receptacles 220. Each wedge 240 is removably attached to receptacle of the plurality of receptacles. Each wedge 240 includes a top surface 245, a first side surface 250, a second side surface 255, and a bottom surface 260. The top surface 245 of the wedge 240 has an arc shape. The top surface 245 of the wedge 240 forms a portion of the outer circumference of the filter wheel. The top surface 245 of the wedge 240 also includes the gripping area 226. The bottom surface 260 of the wedge 240 includes a concave edge. The concave edge of the wedge is configured to abut the second region 230 of the receptacle 220. In some embodiments, the concave edge of a wedge 240 abuts and contacts the convex surface of the receptacle 220. The first side surface 250, a second side surface 255, and a bottom surface 260 of the wedge 240 correspond to and are configured to contact the first region 225, second region 230, and third region 235 of the receptacle 220.

The wedge 240 includes a receiving orifice 265. The receiving orifice 265 can be a central orifice for receiving an optical filter 270. In some embodiments, the receiving orifice 265 includes a convertor 275. The convertor 275 can provide different sizes and shapes to accommodate different filter configurations. For example, the convertor 275 can have a smaller orifice than the receiving orifice 265 to receive a filter having a smaller diameter than the receiving orifice 265. The convertor 275 has different size dimensions (e.g., length, width, diameter, etc.) than the receiving orifice 265.

Figure 5C:
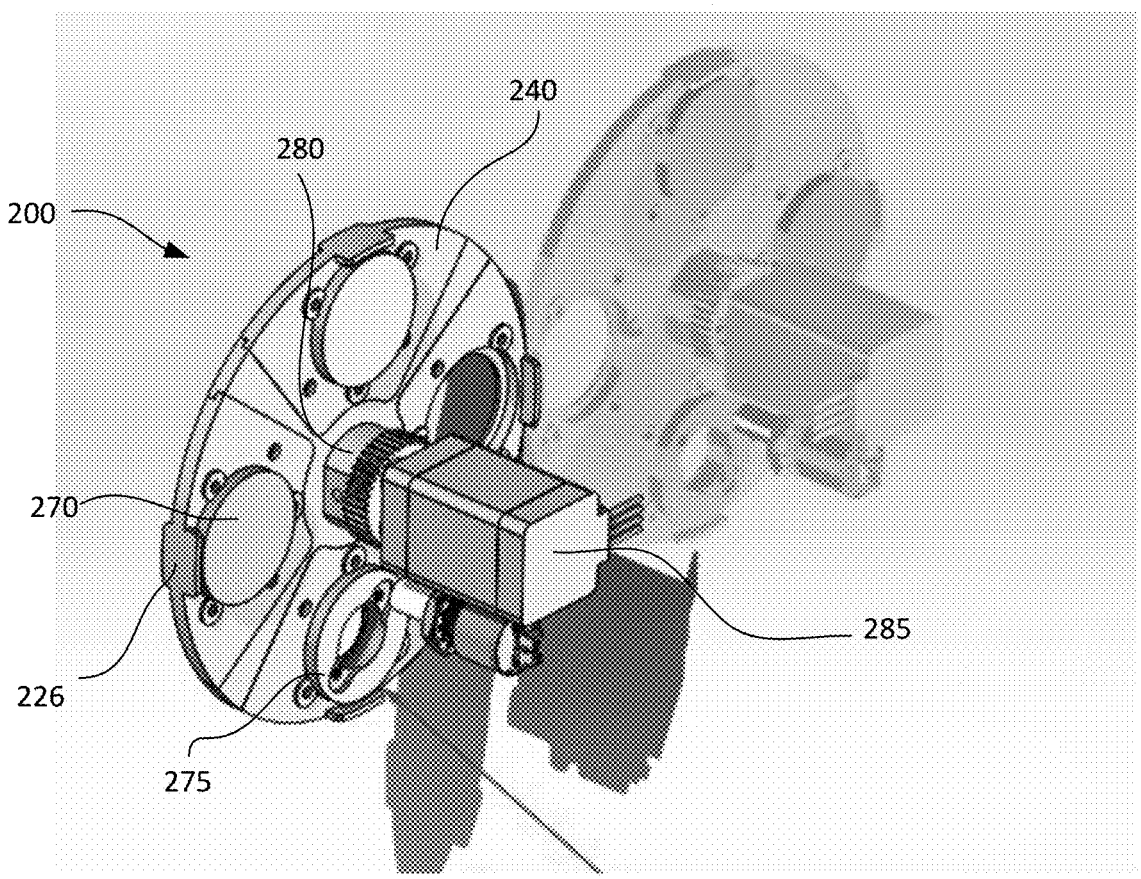
FIG. 5C illustrates a front perspective view of a filter wheel according to some embodiments.

FIG. 5C shows a front perspective view of the filter wheel 200. The filter wheel includes an adapter 280. The adapter 280 is configured to be attached an actuator 285 of the eye imaging system. In some embodiments, the adapter 280 includes a plurality of grooves. The actuator 285 may include a plurality of prongs that are configured to attach to the grooves of the adapter 280. For example, the actuator 285 may be a rotatable arm that can be automatically or manually actuated to move the filter wheel 200. The filter wheel 200 is configured to rotate about an axis (e.g., central axis) to provide a selected optical filter 270 in the imaging pathway.

Figure 6:
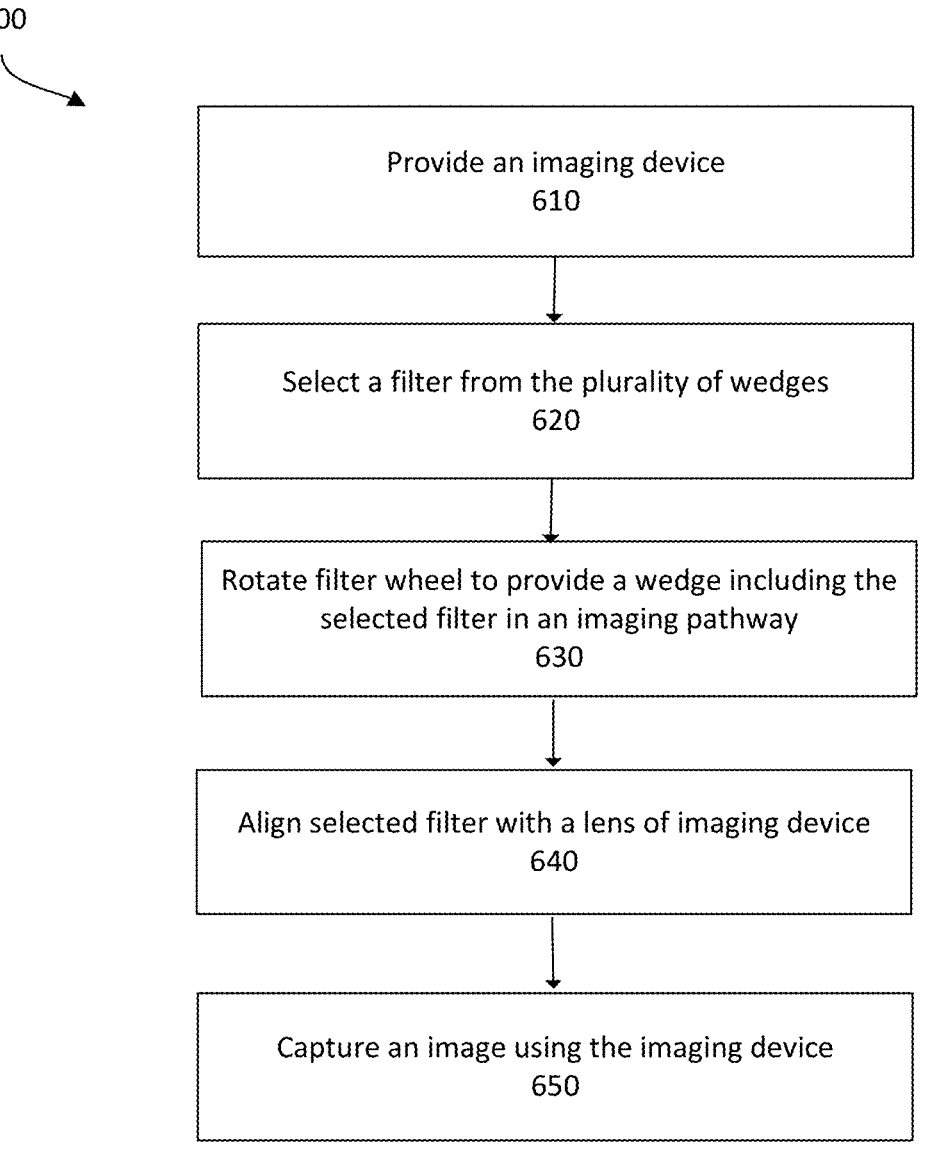
FIG. 6 shows a flowchart of a method of capturing an image according to some embodiments.

FIG. 6 provides a flow diagram of a method for selecting a filter for imaging an eye according to some embodiments. The method 600 includes providing an imaging device including a filter wheel 610. The imaging device may be an eye imaging camera. For example, the eye imaging camera can be the Phoenix ICON camera. The filter wheel may include a main body including a plurality of receptacles and a plurality of wedges. Each of the wedges is attached to one of the plurality of receptacles. Each of the wedges includes a receiving orifice. Each wedge is removably attached to one of the plurality of receptacles. A filter is disposed in the receiving orifice of each of the wedges. The main body of the filter wheel includes an adapter configured to receive an actuator to actuate the filter wheel. The filter wheel is configured to rotate around a central axis of the main body.

The method 600 includes selecting a filter from the plurality of wedges 620. Based on the imaging modality, a specific filter can be selected for imaging. The wedge including the selected filter can be inserted into a receptacle of the filter wheel. In some embodiments, the filter wedge including the selected filter is positioned in the receptacle of the filter wheel prior to imaging. The method 600 includes rotating the filter wheel to a wedge including the selected filter 630. In some embodiments, the filter wheel can be manually adjusted (e.g., rotated) to provide the selected filter in the imaging pathway. In some embodiments, the adapter of the filter wheel is attached to an actuator of the imaging device. For example, the actuator may be a rotatable arm that can be automatically or manually actuated to move the filter wheel to the selected filter. The filter wheel is configured to rotate about an axis (e.g., central axis) to provide a selected optical filter in the imaging pathway. The method 600 includes aligning the selected filter with a lens of the imaging device 640. For example, the filter wheel can be rotated until the selected filter is in the imaging pathway of the lens. The method 600 includes capturing an image using the imaging device after aligning the selected filter with a lens of the imaging device. In some embodiments, the method 600 includes removing a wedge from the filter wheel and inserting a new edge including a different filter than the removed wedge.

It should be appreciated that the specific steps illustrated in FIG. 6 provide a particular method of imaging an eye according to some embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An imaging camera comprising:
a filter wheel comprising:
    a main body including a plurality of receptacles;
    a plurality of wedges, wherein each of the wedges is attached to one of the plurality of receptacles, wherein each of the wedges includes a receiving orifice;
    a filter disposed in the receiving orifice of each of the wedges; and
    an adapter configured to receive an actuator to actuate the filter wheel,
  wherein each wedge is removably attached to one of the plurality of receptacles,
  wherein the filter wheel is configured to rotate around a central axis of the main body.

2. The imaging camera of claim 1, wherein the plurality of wedges includes a first wedge and a second wedge, wherein the filter disposed in the first wedge is different from the filter disposed in the second wedge.

3. The imaging camera of claim 1, wherein the filter wheel is substantially circular, wherein each wedge comprises a top surface that forms a portion of an outer circumference of the filter wheel.

4. The imaging camera of claim 1, wherein each of the wedges comprises a concave edge disposed at a bottom surface, wherein the receptacle comprises a convex surface, wherein the concave edge of a wedge abuts and contacts the convex surface of the receptacle.

5. The imaging camera of claim 1, wherein the main body comprises a plurality of spokes extending from the main body, wherein each receptacle is disposed between an adjacent pair of spokes.

6. The imaging camera of claim 1, wherein the filter wheel further comprises a convertor configured to attach to the receiving orifice of the wedge, wherein the convertor provides a different size dimension than the receiving orifice.

7. The imaging camera of claim 1, wherein the adapter comprises a plurality of grooves to receive one or more prongs from an actuator.

8. The imaging camera of claim 1, wherein imaging device comprises a lens aligned with at least one filter.

9. The imaging camera of claim 1, further comprising a magnetic attachment system comprising a receiving member and a backplate, wherein the backplate is coupled to a lens.

10. The imaging camera of claim 9, wherein the receiving member comprises a base including a first retaining wall and a second retaining wall, wherein the backplate is configured to magnetically attach to the base and is retained within the receiving member via the first retaining wall and the second retaining wall.

11. The imaging camera of claim 9, wherein the backplate is removably attached to the receiving member.

12. A method for selecting a filter for imaging, the method comprising:
  providing an imaging device including a filter wheel comprising:
    a main body including a plurality of receptacles;
    a plurality of wedges, wherein each of the wedges is attached to one of the plurality of receptacles, wherein each of the wedges includes a receiving orifice;
    a filter disposed in the receiving orifice of each of the wedges; and
    an adapter configured to receive an actuator to actuate the filter wheel,
    wherein each wedge is removably attached to one of the plurality of receptacles,
    wherein the filter wheel is configured to rotate around a central axis of the main body;
  selecting a filter from the plurality of wedges;
  rotating the filter wheel to provide a wedge including the selected filter in an imaging pathway; and
  aligning the selected filter with a lens of the imaging device.

13. The method of claim 12, wherein the adapter is coupled to an actuator, wherein the filter wheel is automatically rotated to provide the wedge including the selected filter in an imaging pathway.

14. The method of claim 12, further comprising removing a wedge from the filter wheel.

15. The method of claim 14, further comprising inserting a new edge including a different filter than the removed wedge.

16. The method of claim 12, further comprising capturing an image using the imaging device after aligning the selected filter with a lens of the imaging device.

\* \* \* \* \*